(12) United States Patent
Smith

(10) Patent No.: US 8,258,780 B2
(45) Date of Patent: Sep. 4, 2012

(54) SELF-TESTING SENSOR

(76) Inventor: William L. Smith, Brevard, NC (US)

( * ) Notice: Subject to any disclaimer, the term of this patent is extended or adjusted under 35 U.S.C. 154(b) by 467 days.

(21) Appl. No.: 12/207,573

(22) Filed: Sep. 10, 2008

(65) Prior Publication Data

US 2010/0060264 A1    Mar. 11, 2010

(51) Int. Cl.
*G01B 7/14*    (2006.01)
*G01B 7/30*    (2006.01)

(52) U.S. Cl. .......... 324/207.25; 324/207.24; 324/202

(58) Field of Classification Search .......... 324/207.2, 324/207.21, 207.24, 207.25, 251, 252, 202
See application file for complete search history.

(56) References Cited

U.S. PATENT DOCUMENTS

| | | | |
|---|---|---|---|
| 3,956,693 A | | 5/1976 | Zutrauen et al. |
| 4,488,112 A | | 12/1984 | Thompson et al. |
| 4,491,794 A | | 1/1985 | Daley et al. |
| 4,514,687 A | | 4/1985 | Van Husen |
| 4,831,362 A | * | 5/1989 | Tsaprazis ............... 340/515 |
| 5,032,791 A | | 7/1991 | Bates, Jr. |
| 5,343,145 A | * | 8/1994 | Wellman et al. ............ 324/202 |
| 5,594,173 A | * | 1/1997 | Frey et al. ................. 73/520.01 |
| 5,789,920 A | * | 8/1998 | Gass ........................... 324/260 |
| 5,893,052 A | | 4/1999 | Gresty |
| 6,008,638 A | | 12/1999 | Bleckmann et al. |
| 6,414,481 B1 | | 7/2002 | Butzen |
| 6,923,082 B1 | | 8/2005 | Smith |
| 7,348,771 B2 | | 3/2008 | Goldfine et al. |
| 2007/0139037 A1 | | 6/2007 | Daigre |

FOREIGN PATENT DOCUMENTS

| | | |
|---|---|---|
| DE | 196 53 640 A1 | 6/1998 |
| JP | 403295468 * | 12/1991 ............ 73/1.88 |

OTHER PUBLICATIONS

Translation of JP03295468A.*
Extended European Search Report and Search Opinion (Appln. No. 09169121.2) mailed Feb. 15, 2010, 7 pages.

* cited by examiner

*Primary Examiner* — Reena Aurora
(74) *Attorney, Agent, or Firm* — Womble Carlyle Sandridge & Rice, LLP

(57) ABSTRACT

Systems and methods for performing a self-test on a sensing device are described in the present disclosure. One implementation, among others, includes a method of performing a self test. In this implementation, the method includes supplying a periodic magnetic field upon a sensing element that is configured to sense a parameter of an object. The method further includes receiving an output from the sensing element indicating the operability of the sensing element. It should be noted that the output is received independently of the parameter of the object.

29 Claims, 2 Drawing Sheets

SELF-TESTING SENSOR

TECHNICAL FIELD

The embodiments of the present disclosure generally relate to sensors for monitoring parameters of an object, such as speed or motion. More particularly, the embodiments herein relate to performing a self-test on such sensors.

BACKGROUND

Sensors in use today are configured to sense different types of parameters. In certain environments, some sensors can be installed within systems to sense specific parameters from an optimal vantage point. For example, speed sensors can be positioned in close proximity to a moving object to detect rotational speed, linear speed, position, motion, proximity, presence, or other parameters. Early sensors include magnetic pick-ups that rely on the principle of variable reluctance (VR). However, these VR sensors are unable to sense rotation of the object at low speeds. Also, these sensors have to be placed extremely close to the moving object in order to sense the effect of object movement with enough strength to create usable output signals. If a sensor is installed too close to an object, however, damage could be caused to the sensor during installation of the sensor or during operation of the moving object.

In order to overcome some of the problems associated with VR sensors, developers have created active VR sensors. Active VR sensors include amplifiers that convert analog sine wave output signals from the VR sensor into digital output signals. Having such an amplifier, a sensor can be placed at a larger distance from the object to be sensed. As this air gap between the sensor and the object being sensed is increased, the likelihood that debris would be lodged between the sensor and the object is reduced. Although the larger air gap results in more reliable signals and there is less chance that damage would be done to the sensor during operation, further improvements can still be made in the field of sensing devices.

SUMMARY

The present disclosure describes embodiments of systems and methods for performing a self-test on a sensing device. In one example, a method is described for performing such a self test. Generally, the method includes supplying a periodic magnetic field upon a sensing element, wherein the sensing element is configured to sense a parameter of an object. The method further includes receiving an output from the sensing element indicating the operability of the sensing element. The output in the self-test is received independently of the parameter of the object.

Other features, advantages, and implementations of the present disclosure, not expressly disclosed herein, will be apparent to one of ordinary skill in the art upon examination of the following detailed description and accompanying drawings. It is intended that such implied implementations of the present disclosure be included herein.

BRIEF DESCRIPTION OF THE DRAWINGS

The components of the following figures are illustrated to emphasize the general principles of the present disclosure and are not necessarily drawn to scale. Reference characters designating corresponding components are repeated as necessary throughout the figures for the sake of consistency and clarity.

DETAILED DESCRIPTION

In comparison with sensors developed using the variable reluctance (VR) principle, Hall-effect and magneto resistive sensors provide more effective means for sensing speed, motion, position, proximity, or other parameters. These sensors allow greater air gaps between the sensing element and the object to be sensed. Also, these sensors can be used to sense very low speeds, e.g., rotational speeds, and can even sense the object when it is stationary. Since many sensors are installed permanently within a system, it is normally desirable to perform testing procedures on the sensors themselves to make sure the sensors are operational before they are put into use. Typically, complex electronics are used in an effort to verify the sensor's operability before installation.

The present disclosure describes embodiments of systems and methods for performing self-testing on sensors such as Hall-effect sensors and magneto resistive sensors. Specifically, testing features can be integrated within the housing of the sensors to perform the self-test procedures. The sensors described herein can perform the self-test even when the sensors are located remote from the objects that the sensors are intended to sense. For example, after the self-testing sensors are manufactured, the self-test can be performed to determine whether a respective sensor is operable before the it is installed near the object to be sensed. Also, after installation, the sensor can perform the self-test again during a time when the object is stationary. In this respect, the self-test is independent of the motion or even the presence of the object to be tested.

Figure 1:
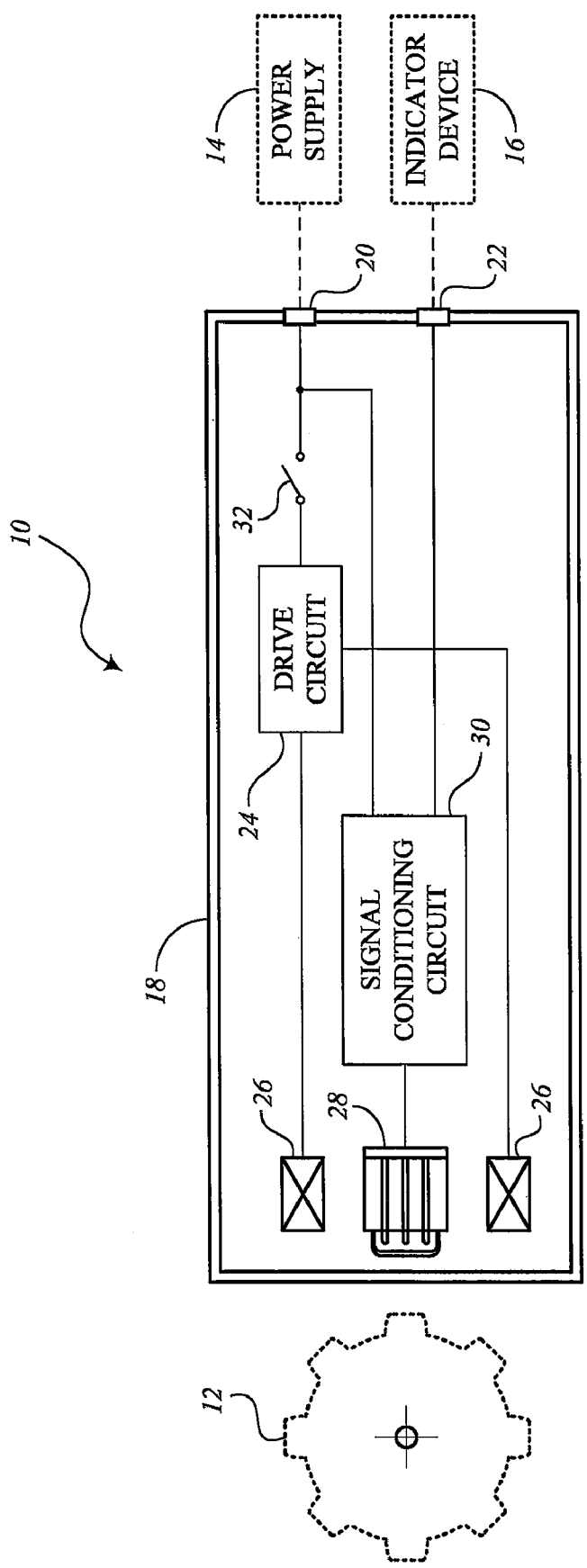
FIG. 1 is a diagram illustrating a self-testing sensor according to one embodiment.

FIG. 1 is a diagram illustrating an embodiment of a self-testing sensor 10. In a normal sensing mode, the self-testing sensor 10 is configured to monitor linear speed, rotational speed, motion, position, proximity, presence, or other parameters of an object 12. The self-testing sensor 10, according to some embodiments, may be a magnetically-biased sensor for detecting magnetically induced parameters effected by a ferrous metal object 12. In other embodiments, the self-test sensor 10 may be a non-biased sensor for detecting magnetic properties of the object 12 when the object contains magnetic components. The self-testing sensor 10 is powered by an external power supply 14. However, in other embodiments, the power supply 14 may be integrated within the self-testing sensor 10 itself. Output signals from the self-testing sensor 10 are provided to an external indicator device 16. The indicator device 16 can be a device that is compatible with the self-testing sensor 10 and may include any suitable mechanism for presenting or displaying signals to a user. For example, the indicator device 16 may be a speedometer, tachometer, oscilloscope, or other suitable display device or output device for indicating, monitoring, or recording signals.

As illustrated in FIG. 1, the object 12 is represented by a rotational component, but it should be noted that the object 12 may have any suitable size or shape and may be capable of any type of movement with respect to the self-testing sensor 10. According to a few non-limiting examples, the object 12 may be a rotating gear wheel, an oscillating or reciprocating element, or other movable component. Also, the object 12 may be a part of any type of machine or equipment. In some embodiments, the object 12 may be completely or partially comprised of ferrous metal. In other embodiments, the object 12 may include a non-magnetic component supporting a plurality of pieces of magnetic material placed at certain distances from each other on the non-magnetic component. Depending on the particular application and design of the object 12 to be sensed, the self-testing sensor 10 may be configured to sense rotational speed, linear speed, proximity, position, motion, movement, etc.

As illustrated in the embodiment shown in FIG. 1, the self-testing sensor 10 includes a housing 18 having a power supply terminal 20 and an output terminal 22. The power supply terminal 20 is configured to receive power from the power supply 14 and the output terminal 22 is configured to supply output signals to the indicator device 16. Regarding embodiments in which the power supply 14 is located within the housing 18, the power supply terminal 20 may be omitted. The power supply terminal 20 can be positioned, at least in part, in or on an outside wall or surface of the housing 18 to enable connection with the power supply 14 when the power supply 14 is located externally with respect to the housing 18. The output terminal 22 is also positioned, at least in part, in or on an outside wall or surface of the housing 18. The output terminal 22 is configured to be in electrical communication with the indicator device 16 and can supply sensing outputs to the indicator device 16. The indicator device 16 may include, for example, a display or indication device, such as an speedometer, oscilloscope, or other suitable device for indicating output signals related to the effects of the sensed parameters of the object. In addition, the indicator device 16 can display artificially induced signals that simulate the effects of the sensed parameters, as explained in more detail below.

Within the housing 18, the self-testing sensor 10 further includes a drive circuit 24, signal induction device 26, sensing element 28, signal conditioning device 30, and self-test enable switch 32. The sensing element 28 may be a Hall-effect sensor, magneto resistive sensor, or other suitable type of magnetically sensitive device for sensing speed, motion, etc. of the object 12. The typical air gap of Hall-effect sensors and magneto resistive sensors is about 0.020 inches to more than about 0.200 inches, depending, for example, on the gear pitch, surrounding metal material, etc.

The self-test enable switch 32 may be positioned, at least in part, in or on an outside wall or surface of the housing 18, and may include any suitable type or combination of electrical and/or mechanical components. The self-test enable switch 32 can be positioned such that a user can activate the self-test enable switch 32 as desired in order to initiate the self-test procedures. In some embodiments, the self-test enable switch 32 is incorporated in the drive circuit 24 and/or can represent an electronic function of the drive circuit 24 for enabling a self-test. As illustrated in FIG. 1, the self-test enable switch 32 is configured to allow electrical communication between the power supply 14 and the drive circuit 24 when it is activated. For example, the self-test enable switch 32 in some implementations can be configured as a normally open switch and only remains closed as long as the user holds the switch in the closed position. With respect to embodiments in which the self-test enable switch 32 is incorporate in the drive circuit 24, the drive circuit 24 may receive constant power from power supply 14 and only drive the signal induction device 26 when the self-test enable switch 32 is activated.

In a self-testing mode, a user activates the self-test enable switch 32 allowing power to be provided from the power supply 14 to the drive circuit 24. When enabled, the drive circuit 24 supplies a pulse or series of pulses to the signal induction device 26. Alternatively, activating the self-test enable switch 32 may enable the drive circuit 24 to supply the pulse or pulse train. The signal induction device 26 may include one or more magnetic coils or other suitable structure for creating a magnetic field or change in magnetic flux in the vicinity of the sensing element 28. In some embodiments, the signal induction device 26 may be a cylindrical or ring-shaped coil. The signal induction device 26 may have any suitable structure, number of coils, etc., depending on the particular application and depending on the object 12 and/or type of signals that are typically received by the sensing element 28 based on the structure or design of the object 12.

In some embodiments, drive circuit 24 may be part of an oscillator or pulse generating device for driving the signal induction device 26. The signals provided by the drive circuit 24 may include periodic pulse excitation signals. The signature of the pulse signals can be customized to the particular object 12 being sensed. For example, if the object 12 is a rotating gear wheel that contains teeth each having a certain width and separated from each other by a certain pitch, then the drive circuit 24 can be configured to provide pulse signals that are preprogrammed to simulate the effects of the rotation of such a gear wheel with the specific teeth width and pitch.

In response to the pulse signals from the drive circuit 24, the signal induction device 26 is configured to create a magnetic field or change in magnetic flux that can be effectively sensed by the sensing element 28. The components of the signal induction device 26 are located near to the sensing element 28 in order that the magnetic signals will be easily detected by the sensing element 28. Also, the magnetic properties induced by the signal induction device 26 simulates the magnetic properties that the object 12 would induce upon the sensing element 28 when the object 12 is in motion. However, in the self-test, the object 12 does not move, or, in some implementations, the object 12 does not even need to be present.

The signals induced by the signal induction device 26 are configured to mimic the signals that the sensing device 28 might receive from the object 12. The signal induction device 26 creates, generates, or transmits magnetic fields or changes in magnetic flux, which are focused primarily on the sensing element 28. Generally, the signal induction device 26 simulates motion or other parameters of the object by changing the magnetic flux field that surrounds the sensing element 28. This type of simulation may be appropriate, for example, when the self-testing sensor 10 is a magnetically biased sensor. For non-biased sensors, the signal induction device 26 simulates the magnetic field generated by the object 12 when the object 12 includes moving magnetic elements that pass close to the sensing element 28. The signal induction device 26 may be designed to generate magnetic fields that do not significantly impact the signal conditioning device 30 and drive circuit 24.

The sensing element 28 senses the magnetic properties applied by the signal induction device 26 during the self-test and provides an output to the signal conditioning device 30. The magnetic properties created by the movement or proximity of the object 12 are also sensed by the sensing element 28. In one respect, the sensing element 28 may respond similarly to both the magnetic properties created by the object 12 in motion and the magnetic properties artificially generated by the signal induction device 26, especially since the motion simulating device 24 can be designed particularly to accurately simulate such motion.

The signal conditioning device 30 may include any suitable electronic components or processing circuitry for conditioning and processing signals. In some embodiments, the signal conditioning device 30 may include an analog-to-digital converter for converting the analog output signals from the sensing element 28 into digital signals. In this respect, the signal conditioning device 30 may comprise a digital signal processor or signal processing device for processing the digital signals. Digitizing the signal may be advantageous since digital signals are typically less likely to be influenced by interference from other circuitry of the self-testing sensor 10. During normal sensing, the power supply 14 provides power to the signal conditioning device 30 to allow the signal conditioning device 30 to process the detected signals from the sensing element 28 and provide an output to the indicator device 16. The signal conditioning device 30 can be designed to provide an appropriate output, e.g., a square wave, depending on the particular design of the indicator device 16.

Signal conditioning device 30 not only processes output signals from the sensing element 28 but can also control the power supplied from the power supply 14 to the sensing element 28. For example, the signal conditioning device 30 can regulate the voltage applied to the sensing element 28 and filter out any spikes, transients, etc.

The signal conditioning device 30 and drive circuit 24 can be positioned within the housing 18 at a distance from the signal induction device 26 and object 12 such that they are not negatively affected by the generated magnetic fields. Also, the signal conditioning device 30 and drive circuit 24 may include an electrically insulating material surrounding the components such that the effects of the magnetic fields from the signal induction device 26 are minimized or reduced. In some embodiments, a partition (not shown) may be positioned within the housing 18 between a first set of components including the signal induction device 26 and the sensing element 28 and a second set of components including the signal conditioning device 30 and drive circuit 24. The partition, in this case, can be used to attenuate the magnetic fields to protect the signal conditioning device 30 and drive circuit 24.

The signal conditioning device 30 is configured to receive the output signals from the sensing element 28 and perform any suitable processing as needed to prepare the signals for the indicator device 16, which is connected to the output terminal 22. The signal conditioning device 30 may amplify or attenuate the output signals as needed to provide signals to the output terminal 22 with an appropriate magnitude or strength. Also, signal conditioning device 30 may include one or more filters for eliminating spikes, voltage transient, noise, or other disturbances.

The self-test is meant to test the operability of the sensing element 28 to verify that it responds in a proper manner. Likewise, the self-test can also test the operability of the signal conditioning device 30, which relays the output signals from the sensing element 28 to the indicator device 16. Depending on the response of the sensing element 28 and signal conditioning device 30, the indicator device 16 can indicate whether these components are operating appropriately. In some embodiments, a user can observe the outputs displayed by the indicator device 16 to determine whether or not the sensing element 28 and signal conditioning device 30 are operational.

In particular, the self-testing sensor 10 can operate in three specific modes. First, the self-testing sensor 10 can perform a self-test to determine the operability of the sensing element 28 and signal conditioning device 30 when the self-testing sensor 10 is not positioned in proximity with the object 12. For example, the self-testing sensor 10 can perform the self-test even when the object 12 is out of range for normal sensing or even when it is completely absent from the vicinity of the self-testing sensor 10. In some embodiments, the self-test in the first mode may be performed at a manufacturing facility after the self-testing sensor 10 is manufactured.

In a second mode, the self-testing sensor 10 can perform a self-test on the sensing element 28 and signal conditioning device 30 when the self-testing sensor 10 is installed near the object 12 in a position for normal sensing of the object 12. For example, the self-testing sensor 10 can be permanently installed with respect to the object 12. However, in this second mode, the object 12 or a movable target portion of the object 12 is static with respect to the self-testing sensor 10. In some situations, the movable target portion may be removed from the object 12 during the self-test. The self-testing sensor 10 can perform the self-test by the artificial excitation from the signal induction device 26 regardless of the presence of the object 12 or the movable target portion.

In a third mode, the self-testing sensor 10 does not perform a self-test but instead senses speed, motion, movement, or other parameter of the object 12, according to the normal sensing procedures of the sensor 10.

Figure 2:
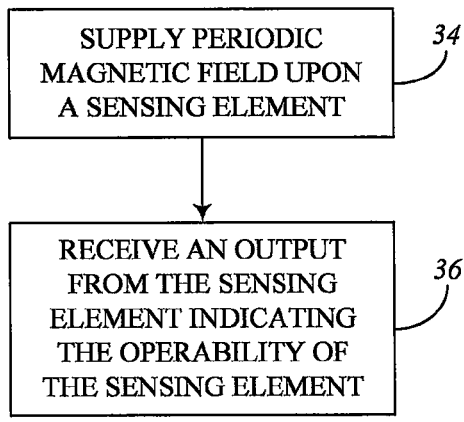
FIG. 2 is a flow diagram of a method of performing a self-test on a sensor according to a first embodiment.

FIG. 2 is a flow diagram showing a first embodiment of a method for performing a self-test on a sensor. In this embodiment, the method includes supplying a periodic magnetic field on a sensing element, as indicated in block 34. In particular, the sensing element is configured to sense motion or other similar parameter of an object. As indicated in block 36, an output is received from the sensing element indicating whether or not the sensing element is operable. For example, the output can be received by a signal conditioning device or processing device. The output can be used to determine whether or not both the sensing element and the signal conditioning device are operating properly. It should be noted that the output during the self-test can be received independently of the motion or presence of the object.

Figure 3:
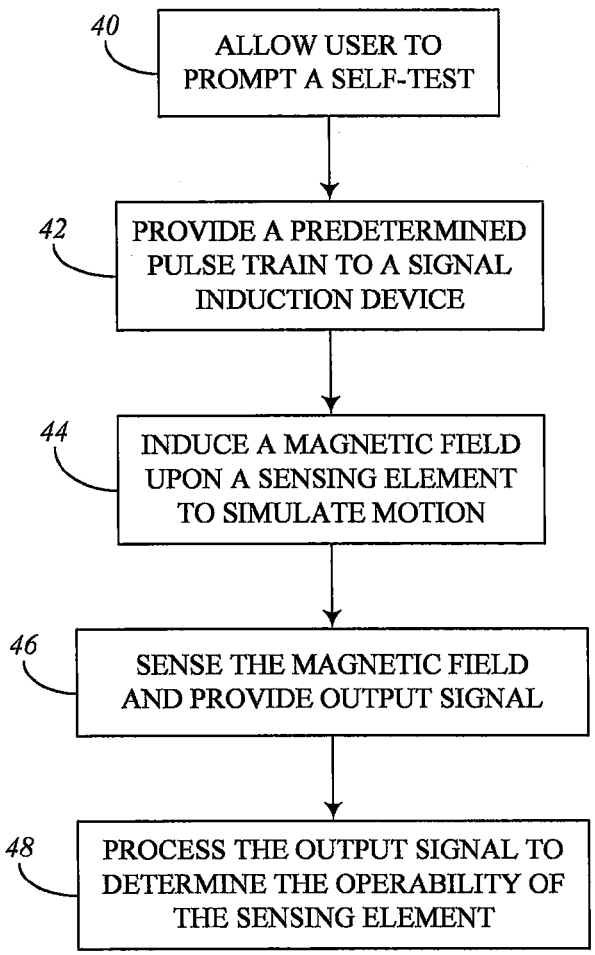
FIG. 3 is flow diagram of a method of performing a self-test on a sensor according to a second embodiment.

FIG. 3 is a flow diagram showing another embodiment of a method for performing a self-test on a sensor. In the embodiment of FIG. 3, the method includes allowing a user to prompt or initiate a self-test, as indicated in block 40. This may be accomplished, for example, by closing a switch. As indicated in block 42, the method includes providing a predetermined pulse or pulse train to a signal induction device. The pulse train may be provided in response to the user's prompt. The signal induction device may be any suitable device for simulating motion or other parameter, or effect of such a parameter, of the object. For example, closing a switch may connect a power source to a drive circuit that is configured to excite the signal induction device or motion simulation device with the predetermined pulse train. The drive circuit can be pre-programmed to provide the pulse train based on the particular design and effects of the object being tested.

As indicated in block 44, a magnetic field is induced upon a sensing element to simulate motion or other parameter of an object. This induction process may be accomplished by the signal induction device or motion simulation device mentioned with respect to the discussion of block 42. The sensing element receiving the induced magnetic field is specifically designed to sense motion or other parameter of the object. As indicated in block 46, the induced magnetic field is sensed by the sensing element, which provides an output in response to the sensed signal.

As indicated in block 48, the output signal is processed to determine the operability of the sensing element. For example, the processing may involve filtering signals to eliminate extraneous spikes or other disturbances. In some embodiments, the determination of whether the sensing element is operable may include providing the output signals to an external device, such as an oscilloscope, to allow a user to observe the output to see if the sensing element is operating properly. Determining operability of the sensing element may also include sensing the operability of a signal conditioning device or other type of processing device configured to process the output signals from the sensing element before forwarding the signals to the external device. It should be understood that two or more of the routines, steps, processes, and/or operations described herein with respect to FIGS. 2 and 3 may be executed substantially simultaneously or in a different order than explicitly described, as would be understood by one of ordinary skill in the art.

The embodiments described herein represent a number of implementation examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

We claim:

1. A self-testing sensor comprising:
    a housing, the housing comprising:
        a sensing element configured to sense at least a motion parameter of an object;
        a signal conditioning device in communication with an output of the sensing element, the signal conditioning device configured to generate a motion signal related to the sensed motion parameter of the object;
        a magnetic induction device configured to induce a magnetic field upon the sensing element to simulate the motion parameter of the object; and
        a driving circuit configured to supply the magnetic induction device with a periodic signal causing the magnetic induction device to induce a periodic magnetic field upon the sensing element;
        wherein, when the periodic magnetic field is induced upon the sensing element, the signal conditioning device is further configured to generate an operability indication signal indicating the operability of the sensing element, wherein the operability indication signal is generated independently of the presence of the object.

2. The self-testing sensor of claim 1, wherein the sensing element is a Hall-effect sensing device or a magneto resistive sensing device.

3. The self-testing sensor of claim 1, wherein the signal conditioning device is configured to provide the motion signal and the operability indication signal to an indicator device.

4. The self-testing sensor of claim 1, wherein the magnetic induction device comprises one or more coils positioned in proximity to the sensing element.

5. The self-testing sensor of claim 1, wherein the operability indication signal is further indicative of the operability of the signal conditioning device.

6. The self-testing sensor of claim 1, wherein the operability indication signal is generated independently of the motion parameter of the object.

7. The self-testing sensor of claim 1, further comprising a self-test enable switch connected between the driving circuit and a power supply, wherein, when the self-test enable switch is activated, the power supply supplies power to the driving circuit to cause the driving circuit to supply the periodic signal.

8. The self-testing sensor of claim 7, wherein the housing is configured to at least partially contain the sensing element, the signal conditioning device, the magnetic induction device, the driving circuit, and the self-test enable switch therein.

9. The self-testing sensor of claim 8, wherein the power supply is external to the housing, and wherein the housing comprises a power supply terminal connecting the external power supply to both the self-test enable switch and the signal conditioning device.

10. The self-testing sensor of claim 1, wherein the object is a rotating object comprising ferrous metal.

11. The self-testing sensor of claim 1, wherein the self-testing sensor is configured to operate in any of three modes, a first mode being a self-test mode occurring before the self-testing sensor is installed near the object, a second mode being a self-test mode occurring when the self-testing sensor is installed near the object but when the object is stationary, and a third mode being an object-testing mode to sense the motion parameter of the object.

12. The self-testing sensor of claim 1, wherein the object is disposed separately from the housing.

13. The self-testing sensor of claim 1, wherein the magnetic induction device induces a magnetic field upon the sensing element to simulate the motion parameter of the object prior to installation of the self-testing sensor such that the self-testing sensor performs a self-test prior to installation.

14. The self-testing sensor of claim 1, wherein the sensor is configured to perform a self-test independent of the motion or presence of the object.

15. The self-testing sensor of claim 1, wherein the structure of the magnetic induction device depends on the structure or design of the object.

16. The self-testing sensor of claim 1, wherein the magnetic induction device is further configured to induce a magnetic field upon the sensing element to simulate a second motion parameter of the object.

17. The self-testing sensor of claim 1, wherein the magnetic induction device is further configured to induce a magnetic field upon the sensing element to simulate a second parameter of the object, wherein the second parameter is not a motion parameter.

18. The self-testing sensor of claim 1, wherein the motion parameter of the object comprises a linear speed, or a rotational speed.

19. A sensor comprising:
    a housing, the housing comprising:
        means for receiving an output signal from a sensing element, the sensing element being configured to sense a parameter of an object;
        means for inducing a magnetic field on the sensing element to simulate an effect of the parameter of the object regardless of the position of the object with respect to the sensing element; and
        means for supplying one or more signals to the means for inducing to cause the means for inducing to induce the magnetic field;
        wherein the means for receiving is configured to receive an operability signal indicative of the operability of the sensing element, the operability signal being independent of the position of the object with respect to the sensing element and independent of the presence of the object.

20. The sensor of claim 19, wherein the means for inducing the magnetic field comprises one or more coils positioned near the sensing element.

21. The sensor of claim 19, wherein the means for supplying is configured to supply a periodic train of pulses causing the means for inducing to induce a periodic magnetic field.

22. The sensor of claim 19, wherein the sensing element is configured to sense a speed of the object.

23. The sensor of claim 22, wherein the speed of the object is rotational speed.

24. The sensor of claim 19, wherein the operability signal is indicative of the response of the sensing element to the induced magnetic field.

25. The sensor of claim 19, wherein the parameter of the object comprises a linear speed, a rotational speed, a motion, a position, a proximity, or a presence.

26. A method of performing a self test, the method comprising:
   supplying a periodic magnetic field upon a sensing element that is configured to sense a parameter of an object, wherein supplying the periodic magnetic field comprises providing, via a driving circuit, a predetermined pulse train to a signal induction device to induce the periodic magnetic field upon the sensing element; and
   receiving an output from the sensing element indicating the operability of the sensing element;
   wherein the output is received independently of the parameter of the object and independently of the presence of the object, and wherein the sensing element, the signal induction device, and the driving circuit are comprised in a single housing.

27. The method of claim 26, wherein the method further comprises allowing a user to prompt the self test.

28. The method of claim 26, wherein inducing the periodic magnetic field further comprises simulating an effect of said parameter of the object.

29. The method of claim 26, wherein the parameter of the object comprises a linear speed, a rotational speed, a motion, a presence, a position, or a proximity.

* * * * *